(12) United States Patent
Ajmera et al.

(10) Patent No.: US 10,592,605 B2
(45) Date of Patent: Mar. 17, 2020

(54) DISCOVERING TERMS USING STATISTICAL CORPUS ANALYSIS

(71) Applicant: International Business Machines Corporation, Armonk, NY (US)

(72) Inventors: Jitendra Ajmera, New Delhi (IN); Ankur Parikh, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 1018 days.

(21) Appl. No.: 14/722,984

(22) Filed: May 27, 2015

(65) Prior Publication Data

US 2016/0117313 A1 Apr. 28, 2016

Related U.S. Application Data

(63) Continuation of application No. 14/520,645, filed on Oct. 22, 2014.

(51) Int. Cl.
  *G06F 16/27* (2019.01)
  *G06F 17/27* (2006.01)
  (Continued)

(52) U.S. Cl.
  CPC ...... *G06F 17/2785* (2013.01); *G06F 16/3344* (2019.01); *G06F 16/345* (2019.01); *G06F 16/35* (2019.01)

(58) Field of Classification Search
  CPC .. G06F 17/30646; G06F 17/274; G06F 16/29; G06F 17/271; G06F 17/2785
  See application file for complete search history.

(56) References Cited

U.S. PATENT DOCUMENTS 7,478,092 B2  1/2009  Warburton et al.
8,073,877 B2  12/2011  Irmak et al.
(Continued)

FOREIGN PATENT DOCUMENTS

EP  2315129 A1  4/2011
WO  2004114157 A1  12/2004

OTHER PUBLICATIONS

IBM, "List of IBM Patents or Patent Applications Treated as Related", Appendix P, dated May 4, 2017, 2 pages.
(Continued)

*Primary Examiner* — Mariela Reyes
*Assistant Examiner* — Courtney Harmon
(74) *Attorney, Agent, or Firm* — William H. Hartwell

(57) ABSTRACT

Software that extracts contextually relevant terms from a text sample (or corpus) by performing the following steps: (i) identifying a first term from a corpus, based, at least in part, on a set of initial contextual characteristic(s), where each initial contextual characteristic of the set of initial contextual characteristic(s) relates to the contextual use of at least one category related term of a set of category related term(s) in the corpus; (ii) adding the first term to the set of category related term(s), thereby creating a revised set of category related term(s) and a set of first term contextual characteristic(s), where each first term contextual characteristic of the set of first term contextual characteristic(s) relates to the contextual use of the first term in the corpus; and (iii) identifying a second term from the corpus, based, at least in part, on the set of first term contextual characteristic(s).

20 Claims, 14 Drawing Sheets

(51) Int. Cl.
*G06F 16/35* (2019.01)
*G06F 16/34* (2019.01)
*G06F 16/33* (2019.01)

(56) References Cited

U.S. PATENT DOCUMENTS

| | | | |
|---|---|---|---|
| 8,255,405 B2 | 8/2012 | Basu et al. | |
| 8,589,399 B1* | 11/2013 | Lee | G06F 17/30616 707/737 |
| 9,477,752 B1* | 10/2016 | Romano | G06F 17/30734 |
| 2008/0010274 A1 | 1/2008 | Carus | |
| 2008/0215309 A1 | 9/2008 | Weischedel et al. | |
| 2010/0125540 A1 | 5/2010 | Stefik et al. | |
| 2010/0185689 A1* | 7/2010 | Hu | G06F 17/2775 707/803 |
| 2010/0274770 A1* | 10/2010 | Gupta | G06F 17/30598 707/688 |
| 2011/0093452 A1* | 4/2011 | Jain | G06F 17/3064 707/723 |
| 2011/0246486 A1* | 10/2011 | Peng | G06F 17/2775 707/750 |
| 2012/0271788 A1* | 10/2012 | Fang | G06F 17/2735 706/50 |
| 2013/0117024 A1 | 5/2013 | Glass et al. | |
| 2013/0132365 A1* | 5/2013 | Chang | G06Q 30/0241 707/710 |
| 2013/0173258 A1* | 7/2013 | Liu | G06F 17/2217 704/9 |
| 2013/0246430 A1* | 9/2013 | Szucs | G06F 16/93 707/738 |
| 2014/0082003 A1* | 3/2014 | Feldman | G06F 17/2705 707/755 |
| 2014/0172417 A1 | 6/2014 | Monk, II et al. | |
| 2015/0199333 A1* | 7/2015 | Nekhay | G06F 17/278 704/9 |
| 2016/0034305 A1 | 2/2016 | Shear et al. | |
| 2016/0117386 A1 | 4/2016 | Ajmera et al. | |

OTHER PUBLICATIONS

Ananiadou, Sophia, "A methodology for automatic term recognition", Proceedings of the 15th conference on Computational linguistics—COLING '94, vol. 2, pp. 1034-1038, Stroudsburg, PA, USA© 1994.

Bourigault, Didier, "Surface grammatical analysis for the extraction of terminological noun phrases", Proceedings of the 14th conference on Computational linguistics—COLING '92, vol. 3, pp. 977-981, Stroudsburg, PA, USA © 1992.

Deane, Paul, "A Nonparametric Method for Extraction of Candidate Phrasal Terms", Proceedings of the 43rd Annual Meeting of the ACL, pp. 605-613, Ann Arbor, Jun. 2005, © 2005 Association for Computational Linguistics.

Frantzi et al., "Automatic Recognition of Multi-Word Terms: the C-value/NC-value Method", International Journal on Digital Libraries, Aug. 2000, vol. 3, Issue 2, pp. 115-130, Springer-Verlag.

Ismail et al., "Utilizing Contextually Relevant Terms in Bilingual Lexicon Extraction", Proceedings of the NAACL HLT Workshop on Unsupervised and Minimally Supervised Learning of Lexical Semantics, pp. 10-17, Boulder, Colorado, Jun. 2009, © 2009 Association for Computational Linguistics.

Maynard et al., "Identifying Contextual Information for Multi-Word Term Extraction", Dept. of Computing & Mathematics, Manchester Metropolitan University, Manchester, M1 5GD, U.K., Mar. 24, 1999, pp. 1-10.

Maynard et al., "Identifying terms by their family and friends", Proceedings of the 18th conference on Computational linguistics—COLING '00, vol. 1, pp. 530-536, Stroudsburg, PA, USA © 2000.

Maynard et al., "Term Extraction using a Similarity-based Approach", Dept. of Computing & Mathematics, Manchester Metropolitan University, Manchester, M1 5GD, U.K., Mar. 4, 1999.

Nakashole et al., "Scalable Knowledge Harvesting with High Precision and High Recall", WSDM'11, Feb. 9-12, 2011, Hong Kong, China, Copyright 2011 ACM 978-1-4503-0493—Jan. 11, 2002.

Nerbonne, John, "Computational Linguistics could Serve History of Science", Center for Language and Cognition, University of Groningen, Crossing Boundaries: History of Science and Computational Linguistics, Bari, Apr. 28, 2008.

Ulanov et al., "Term Validation for Vocabulary Construction and Key Term Extraction", Proceedings of Recent Advances in Natural Language Processing, pp. 776-780, Hissar, Bulgaria, Sep. 12-14, 2011.

Wasilewska, Anita, "Apriori Algorithm" Lecture Notes, provided in Main Idea of Disclosure by Inventor on Jan. 31, 2014.

Wermter et al., "Finding New Terminology in Very Large Corpora", K-CAP '05, Oct. 2-5, 2005, Banff, Alberta, Canada, Copyright 2005 ACM 1-59593-163/5/05/0010, pp. 137-144.

Zhang et al., "A comparative evaluation of term recognition algorithms", Proceedings of the Sixth International Conference on Language Resources and Evaluation (LREC08), (2008), pp. 2108-2113.

* cited by examiner

| STEP | EXAMPLE OUTPUT |
|---|---|
| S514 (frequent unigram extraction) | ManufacturerA, 103<br>PhoneD, 34<br>Airplane, 39<br>Mode, 67<br>CarrierA, 203<br>Network, 112<br>is, 409<br>enable, 234<br>disable, 245<br>ManufacturerB, 145<br>PhoneA, 35<br>W, 35<br>4G, 35<br>J, 34<br>17, 34<br>tap, 243<br>connect, 312 |
| S514 (frequent bigram extraction) | ManufacturerA PhoneD, 34<br>PhoneD J, 34<br>Airplane Mode, 39<br>CarrierA Network, 97<br>ManufacturerB PhoneA, 35<br>PhoneA W, 35<br>W 4G, 35<br>J 17, 34<br>Connect ManufacturerA, 33<br>Enable Airplane, 32 |
| S514 (frequent trigram extraction) | ManufacturerA PhoneD J, 34<br>PhoneD J 17, 34<br>Enable Airplane Mode, 23<br>Connect ManufacturerA PhoneD, 21<br>ManufacturerB PhoneA W, 35<br>PhoneA W 4G, 35 |
| S514 (frequent 4-gram extraction) | ManufacturerA PhoneD J 17, 34<br>ManufacturerB PhoneA W 4G, 35<br>Connect ManufacturerA PhoneD J, 21 |

FIG. 9

| STEP | EXAMPLE OUTPUT |
|---|---|
| S516 (forward rule generation) | ManufacturerA -> PhoneD (0.33)<br>PhoneD -> J (1.00)<br>Airplane -> Mode (1.00)<br>CarrierA -> Network (0.47)<br>ManufacturerB -> PhoneA (0.24)<br>PhoneA -> W (0.24)<br>W -> 4G (0.24)<br>J -> 17 (1.00)<br>Connect -> ManufacturerA (0.10)<br>Enable -> Airplane (0.09)<br>ManufacturerA PhoneD -> J (1.00)<br>PhoneD J -> 17 (1.00)<br>Enable Airplane -> Mode (1.00)<br>Connect ManufacturerA -> PhoneD (0.63)<br>ManufacturerB PhoneA -> W (1.00)<br>PhoneA W -> 4G (1.00)<br>ManufacturerA PhoneD J -> 17 (1.00)<br>ManufacturerB PhoneA W -> 4G (1.00)<br>Connect ManufacturerA PhoneD -> J (1.00) |
| S516 (inverse rule generation) | ManufacturerA <- PhoneD (1.00)<br>PhoneD <- J (1.00)<br>ManufacturerA PhoneD <- J (1.00)<br>Airplane <- Mode (0.58)<br>CarrierA <- Network (0.86)<br>ManufacturerB <- PhoneA (1.00)<br>PhoneA <- W (1.00)<br>ManufacturerB PhoneA <- W (1.00)<br>W <- 4G (1.00)<br>ManufacturerB PhoneA W <- 4G (1.00)<br>J <- 17 (1.00)<br>ManufacturerA <- PhoneD J 17 (1.00)<br>ManufacturerA PhoneD J <- 17 (1.00)<br>Connect <- ManufacturerA (0.32)<br>Enable <- Airplane (0.58)<br>ManufacturerA <- PhoneD J (1.00)<br>PhoneD <- J 17 (1.00)<br>Enable <- Airplane Mode (0.58)<br>Connect <- ManufacturerA PhoneD (0.61)<br>ManufacturerB <- PhoneA W (1.00)<br>PhoneA <- W 4G(1.00)<br>ManufacturerA <- PhoneD J  17 (1.00)<br>ManufacturerB <- PhoneA W 4G (1.00)<br>Connect <- ManufacturerA PhoneD J (0.61) |

FIG. 10

| STEP | EXAMPLE OUTPUT |
|---|---|
| 1102 — S518 (filter n-grams) | PhoneD, ManufacturerA PhoneD, ManufacturerA PhoneD J, PhoneD J 17, J, Network, PhoneA, ManufacturerB PhoneA, W, 4G, 17, PhoneD J, J 17, PhoneA W, W 4G, PhoneD J 17, PhoneA W 4G |
| 1104 — S518 (remaining n-grams) | ManufacturerA, Airplane, Mode, CarrierA, is, enable, disable, ManufacturerB, tap, connect, Airplane Mode, CarrierA Network, Connect ManufacturerA, Enable Airplane, Enable Airplane Mode, Connect ManufacturerA PhoneD, ManufacturerA PhoneD J 17, ManufacturerB PhoneA W 4G, Connect ManufacturerA PhoneD J |
| 1106 — S520 (filter n-grams) | Connect ManufacturerA, Enable Airplane, Connect ManufacturerA PhoneD |
| 1108 — S520 (remaining n-grams/candidate terms) | ManufacturerA, Airplane, Mode, CarrierA, is, enable, disable, ManufacturerB, tap, connect, Airplane Mode, CarrierA Network, Enable Airplane Mode, ManufacturerA PhoneD J 17, ManufacturerB PhoneA W 4G, Connect ManufacturerA PhoneD J |

FIG. 11

| STEP | EXAMPLE OUTPUT |
|---|---|
| 1202 — S602 (extract lexicon terms) | ManufacturerC PhoneB 12<br>CarrierB Broadband<br>PhoneB 12<br>PhoneC<br>Vibrate Mode |
| 1204 — S602 (filter and replace term variations from lexicon terms) | ManufacturerC <- PhoneB 12 (1.00)<br>ManufacturerB <- PhoneC (0.97) |
| 1206 — S602 (resulting modified lexicon) | ManufacturerC PhoneB 12<br>CarrierB Broadband<br>ManufacturerB PhoneC<br>Vibrate Mode |
| 1208 — S604 | ManufacturerB PhoneC - 155.32<br>ManufacturerC PhoneB 12 - 123.67<br>Vibrate Mode - 98.34<br>CarrierB Broadband - 87.67 |
| 1210 — S606 | ManufacturerB PhoneC<br>ManufacturerC PhoneB 12<br>Vibrate Mode<br>CarrierB Broadband |

| STEP | EXAMPLE OUTPUT |
|---|---|
| S608 | Switch-Off - ManufacturerB PhoneC, ManufacturerC PhoneB 12<br>Switch-On - ManufacturerB PhoneC, ManufacturerC PhoneB 12<br>Enable - Vibrate Mode<br>Disable - vibrate Mode<br>Call - CarrierB Broadband<br>Service - CarrierB broadband<br>Your - ManufacturerB PhoneC, ManufacturerC PhoneB 12<br>From - ManufacturerB PhoneC, ManufacturerC PhoneB 12, CarrierB Broadband<br>To - ManufacturerB PhoneC, ManufacturerC PhoneB 12, CarrierB Broadband, Vibrate mode<br>Connection - CarrierB Broadband<br>Charge - ManufacturerB PhoneC, ManufacturerC PhoneB 12<br>Connect - ManufacturerB PhoneC, ManufacturerC PhoneB 12<br>Adaptor - ManufacturerB PhoneC, ManufacturerC PhoneB 12 |
| S610 | Switch-Off - ManufacturerB PhoneC, ManufactureC PhoneB 12<br>Switch-On - ManufacturerB PhoneC, ManufacturerC PhoneB 12<br>Enable - Vibrate Mode<br>Disable - Vibrate Mode<br>Call - CarrierB Broadband<br>Service - CarrierB Broadband<br>Connection - CarrierB Broadband<br>Charge - ManufacturerB PhoneC, ManufacturerC PhoneB 12<br>Connect - ManufacturerB PhoneC, ManufacturerC PhoneB 12<br>Adaptor - ManufacturerB PhoneC, ManufacturerC PhoneB 12 |
| S612 | Switch-Off = 0.5<br>Switch-On = 0.5<br>Enable = 0.25<br>Disable = 0.25<br>Call = 0.25<br>Service = 0.25<br>Connection = 0.25<br>Charge = 0.5<br>Connect = 0.5<br>Adaptor = 0.5 |

1302 — (S608 row)
1304 — (S610 row)
1306 — (S612 row)

FIG. 13

| STEP | EXAMPLE OUTPUT |
|---|---|
| S702 | Switch-Off - ManufacturerA PhoneD J 17(32) ,ManufacturerB PhoneA W 4G(37)<br>Switch-On - ManufacturerA PhoneD J 17(15), ManufacturerB PhoneA W 4G(23)<br>Enable - Airplane Mode(12)<br>Disable - Airplane Mode(43)<br>Call - CarrierA Network(17), ManufacturerA(10), ManufacturerB(12)<br>Service - CarrierA(24), ManufacturerA(27), ManufacturerB(17)<br>Connection - CarrierA Network(32)<br>Charge - ManufacturerA PhoneD J 17(12), ManufacturerB PhoneA W 4G(15)<br>Connect - ManufacturerA PhoneD J 17(23), ManufacturerB PhoneA W 4G(37)<br>Adaptor - ManufacturerA PhoneD J 17(8), ManufacturerB PhoneA W 4G(7)<br>Digital - Mode(43)<br>Complain - CarrierA Network(12)<br>Service Center - ManufacturerB(18), ManufacturerA(15)<br>From - ManufacturerA, ManufacturerB(70), Airplane Mode(65), ManufacturerA PhoneD J 17(47), ManufacturerB PhoneA W 4G(82)<br>A - is(231)<br>Home Screen - Tap(54)<br>Display Screen - Tap(53)<br>Silent Mode - Enable(27), Disable(22)<br>To - ManufacturerA(78), ManufacturerB(65), Airplane Mode(43), ManufacturerA PhoneD J 17(32), ManufacturerB PhoneA W 4G(89)<br>Your - CarrierA Network(24), ManufacturerA PhoneD J 17(28), ManufacturerB PhoneA W 4G(34) |
| S704 | Switch-Off - ManufacturerA PhoneD J 17(32) ,ManufacturerB PhoneA W 4G(37)<br>Switch-On - ManufacturerA PhoneD J 17(15), ManufacturerB PhoneA W 4G(23)<br>Enable - Airplane Mode(12)<br>Disable - Airplane Mode(43)<br>Call - CarrierA Network(17), ManufacturerA(10), ManufacturerB(12)<br>Service - CarrierA(24), ManufacturerA(27), ManufacturerB(17)<br>Connection - CarrierA Network(32)<br>Charge - ManufacturerA PhoneD J 17(12), ManufacturerB PhoneA W 4G(15)<br>Connect - ManufacturerA PhoneD J 17(23), ManufacturerB PhoneA W 4G(37)<br>Adaptor - ManufacturerA PhoneD J 17(8), ManufacturerB PhoneA W 4G(7)<br>Digital - Mode(43)<br>Complain - CarrierA Network(12)<br>Service Center - ManufacturerB(18), ManufacturerA(15)<br>Home Screen - Tap(54)<br>Display Screen - Tap(53)<br>Silent Mode - Enable(27), Disable(22) |

| STEP | EXAMPLE OUTPUT |
|------|----------------|
| S706 | ManufacturerA PhoneD J 17 = 32*0.5 + 15*0.5 + 12*0.5 + 23*0.5 + 8*0.5 = 45.0<br>ManufacturerB PhoneA W 4G = 37*0.5 + 23*0.5 + 15*0.5 + 37*0.5 + 7*0.5 = 59.5<br>ManufacturerA = 10*0.25 + 27*0.25 + 15*0 = 9.25<br>ManufacturerB = 12*0.25 + 17*0.25 + 18*0 = 7.25<br>CarrierA = 24*0.25 = 6.0<br>CarrierA Network = 17*0.25 + 32 * 0.25 + 12 * 0 = 12.25<br>Airplane Mode = 12+0.25 + 43*0.25 = 16.25<br>Enable = 27*0 = 0<br>Disable = 22*0 = 0<br>Tap = 54*0 + 53*0 = 0<br>Mode = 43*0 = 0<br>Airplane = 39*0 = 0<br>Is = 0*0 = 0<br>Connect = 0*0 = 0<br>Enable Airplane Mode = 0*0 = 0<br>Connect ManufacturerA PhoneD J = 0*0 = 0 |
| S708 | ManufacturerB PhoneA W 4G 59.5<br>ManufacturerA PhoneD J 17 45.0<br>Airplane Mode 16.25<br>CarrierA Network 12.25<br>ManufacturerA 9.25<br>ManufacturerB 7.25<br>CarrierA 6.0<br>Enable 0<br>Disable 0<br>Tap 0<br>Mode 0<br>Airplane 0<br>Is 0<br>Connect 0<br>Enable Airplane Mode 0<br>Connect ManufacturerA PhoneD J 0 |

1502 — (S706 row)
1504 — (S708 row)

FIG. 15

| STEP | EXAMPLE OUTPUT |
|------|----------------|
| S802 | ManufacturerB PhoneA W 4G<br>ManufacturerA PhoneD J 17<br>Airplane Mode<br>CarrierA Network<br>ManufacturerA<br>ManufacturerB |
| S804 | Airplane<br>Mode<br>CarrierA<br>is<br>enable<br>disable<br>tap<br>connect<br>Enable Airplane Mode<br>Connect<br>ManufacturerA PhoneD J |
| S410 | ManufacturerC PhoneB 12<br>CarrierB Broadband<br>Vibrate Mode<br>ManufacturerB PhoneC<br>ManufacturerB<br>ManufacturerA<br>CarrierA<br>Network<br>Airplane Mode<br>ManufacturerA PhoneD J 17<br>ManufacturerB PhoneA W 4G |

1600

1602 — (S802 row)
1604 — (S804 row)
1606 — (S410 row)

FIG. 16

DISCOVERING TERMS USING STATISTICAL CORPUS ANALYSIS

BACKGROUND OF THE INVENTION

The present invention relates generally to the field of natural language processing, and more particularly to "term extraction."

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding (that is, enabling computers to derive meaning from human or natural language input).

Information Extraction (IE) is a known element of NLP. IE is the task of automatically extracting structured information from unstructured (and/or semi-structured) machine-readable documents. Term Extraction is a sub-task of IE. The goal of Term Extraction is to automatically extract relevant terms from a given text (or "corpus"). Term Extraction is used in many NLP tasks and applications, such as question answering, information retrieval, ontology engineering, semantic web, text summarization, document classification, and clustering. Generally, in term extraction, statistical and machine learning methods may be used to help select relevant terms.

Domain ontologies are known. A domain ontology represents concepts which belong to a particular "domain" such as an industry or a genre. In fact, multiple domain ontologies may exist within a single domain due to differences in language, intended use of the ontologies, and different perceptions of the domain. However, since domain ontologies represent concepts in very specific and often eclectic ways, they are often incompatible. In the context of NLP, term extraction becomes difficult when the text being processed belongs to a different domain (for example, medical technology) than the domain from which the NLP software was built (for example, financial news).

SUMMARY

According to an aspect of the present invention, there is a method, computer program product and/or system that performs the following steps (not necessarily in the following order): (i) identifying a first term from a corpus, based, at least in part, on a set of initial contextual characteristic(s), where each initial contextual characteristic of the set of initial contextual characteristic(s) relates to the contextual use of at least one category related term of a set of category related term(s) in the corpus; (ii) adding the first term to the set of category related term(s), thereby creating a revised set of category related term(s) and a set of first term contextual characteristic(s), where each first term contextual characteristic of the set of first term contextual characteristic(s) relates to the contextual use of the first term in the corpus; and (iii) identifying a second term from the corpus, based, at least in part, on the set of first term contextual characteristic(s).

BRIEF DESCRIPTION OF THE DRAWINGS

FIG. 9 is a table view showing information that is generated by and helpful in understanding embodiments of the present invention;

FIG. 10 is a table view showing information that is generated by and helpful in understanding embodiments of the present invention;

FIG. 11 is a table view showing information that is generated by and helpful in understanding embodiments of the present invention;

FIG. 12 is a table view showing information that is generated by and helpful in understanding embodiments of the present invention;

FIG. 13 is a table view showing information that is generated by and helpful in understanding embodiments of the present invention;

FIG. 14 is a table view showing information that is generated by and helpful in understanding embodiments of the present invention;

FIG. 15 is a table view showing information that is generated by and helpful in understanding embodiments of the present invention; and FIG. 16 is a table view showing information that is generated by and helpful in understanding embodiments of the present invention.

DETAILED DESCRIPTION

Figure 1:
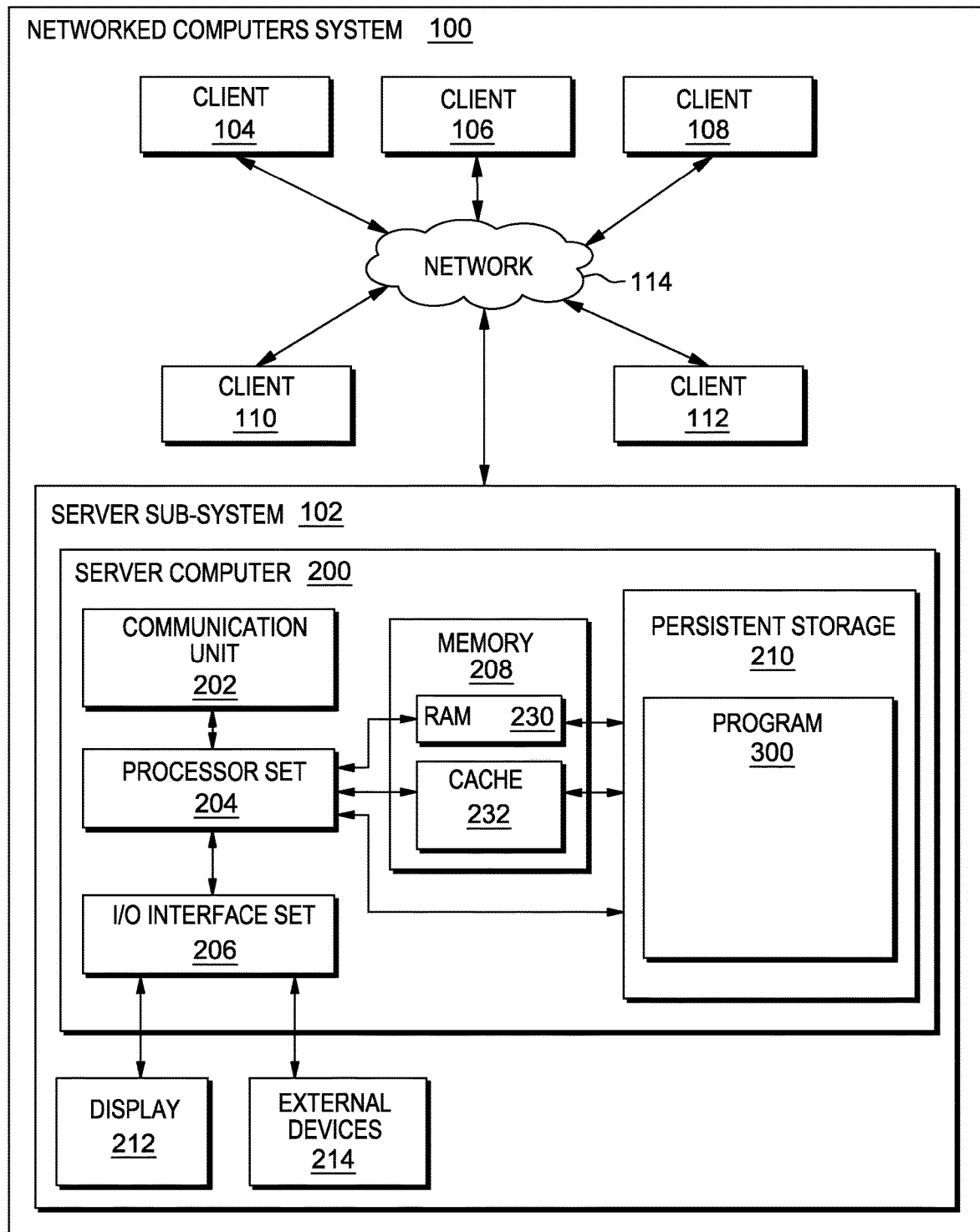
FIG. 1 is a block diagram view of a first embodiment of a system according to the present invention.

Some embodiments of the present invention extract contextually relevant terms from a text sample (or corpus) by iteratively discovering new terms using weighted "contextual characteristics" of terms discovered in previous iterations. Roughly speaking, a "contextual characteristic" is a feature of a term derived from that term's particular usage in a given corpus (for example, one contextual characteristic is a list of words that commonly precede or follow a given term in the corpus). This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: sub-system 102; client sub-systems 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
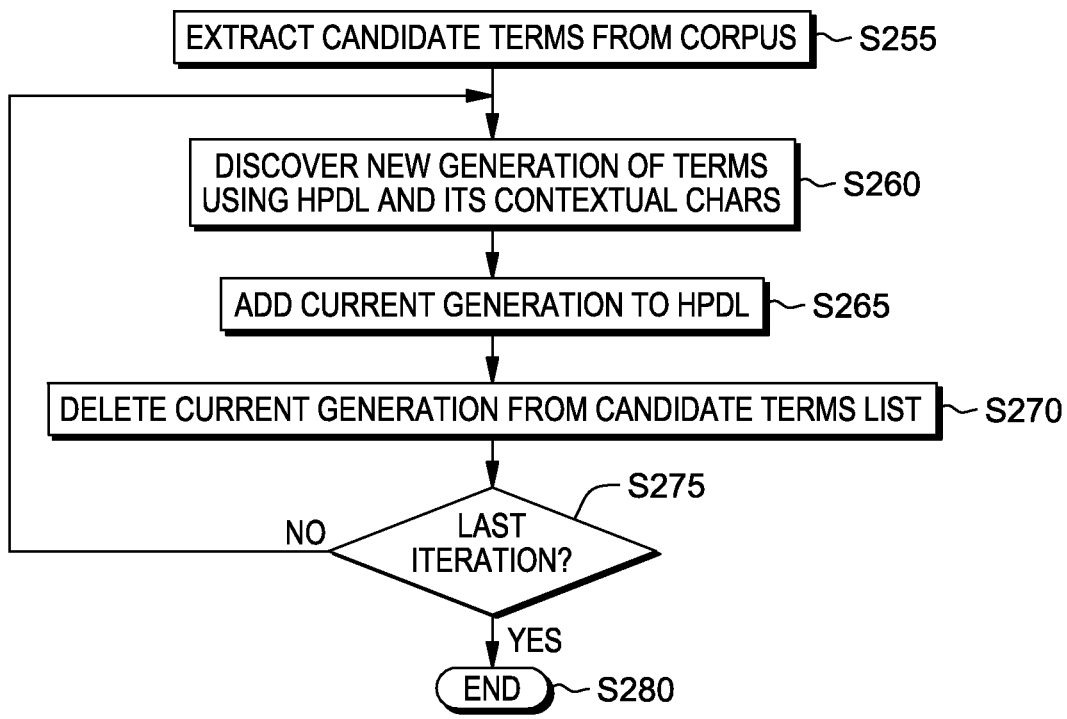
FIG. 2 is a flowchart showing a first embodiment method performed, at least in part, by the first embodiment system.
Figure 3:
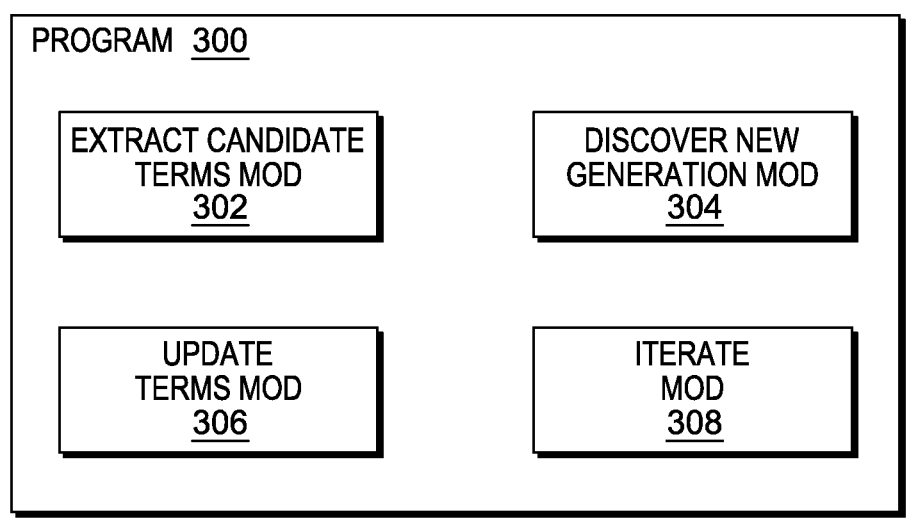
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

The present embodiment refers extensively to a high precision domain lexicon (HPDL). The HPDL (also referred to as a "set of category related terms") is a collection of terms (words or sets of words) that belong to a specific domain, category, or genre ("domain"). In term extraction, and more generally in natural language processing, the HPDL can serve as an underlying "knowledge base" for a given domain so as to extract more contextually relevant terms from a piece of text (or corpus). In many embodiments of the present invention, the HPDL is used to: (i) extract contextually relevant terms (term extraction); and (ii) extract additional HPDL-eligible terms in order to grow, strengthen, and/or expand the HPDL.

HPDL domains may have multiple categories (or subdomains). For example, the domain of smartphones may include categories such as smartphone models, smartphone apps, and/or smartphone modes. It is contemplated that the present invention may apply to HPDLs with singular domains, multiple domains, and/or multiple domain categories (or sub-domains).

In some embodiments of the present invention, method 250 may begin with an existing, predefined HPDL, while in other embodiments the HPDL may be initially extracted from the corpus using, for example, term extraction methods adapted to achieve high levels of precision. Some known methods for extracting an initial HPDL from the corpus are discussed below in the Further Comments and/or Embodiments Sub-Section of this Detailed Description. In the present example embodiment, the HPDL has a domain of "things that jump" and initially includes the following terms: (i) fox; and (ii) rabbit (in other embodiments, an HPDL including the terms "fox" and "rabbit" might also have a domain of "animals" and a sub-domain of "mammals").

The present embodiment also refers extensively to a corpus. The corpus is a text sample that method 250 extracts relevant terms from. In other words, the corpus is the text that is being acted upon (interpreted, processed, classified, etc.) during term extraction. In the present example embodiment, the corpus includes the following text: "A quick brown fox jumps over the lazy dog, but a quicker, more nimble kangaroo jumps over the fox. The following day, while the kangaroo leaps over the still-lazy dog, a determined frog leaps over a surprisingly speedy sloth."

Processing begins at step S255, where extract candidate terms module ("mod") 302 extracts candidate terms (also referred to as "relevant terms") from the corpus. In many embodiments, various statistical methods are used to extract relevant candidate terms. A number of these known methods are discussed below in the Further Comments and/or Embodiments Sub-Section of this Detailed Description. However, these are not meant to be all-inclusive or limiting, as other, less traditional extraction methods may also be used. In other embodiments of the present invention, dictionaries or domain lexicons different from and/or unrelated to the HPDL may be used in this step. For example, in the present example embodiment, candidate terms are extracted from the corpus if they are identified as "animals". As such, the following terms are extracted from the corpus: (i) fox; (ii) dog; (iii) kangaroo; (iv) frog; and (v) sloth. Furthermore, terms that are already in the HPDL are excluded from the candidate terms list. Therefore, "fox" is not included in the candidate terms list, and the resulting list is as follows: (i) dog; (ii) kangaroo; (iii) frog; and (iv) sloth.

Processing proceeds to step S260, where discover new generation mod 304 discovers a new generation of HPDL terms from the candidate terms using the HPDL and its contextual characteristics. This step begins by identifying contextual characteristics (or "initial contextual characteristics") of the terms in the HPDL. A contextual characteristic is a feature of a term derived from that term's particular usage in a given corpus (for a more complete definition of "contextual characteristic," see the Definitions Sub-Section of this Detailed Description). In the present example embodiment, the contextual characteristic for each term in the HPDL is the word immediately following that term in the corpus (when a term is the last word in a sentence, it does not have a contextual characteristic). So, in the present embodiment, the only contextual characteristic for the term "fox" (the first HPDL term) is "jumps", because the only word immediately following "fox" in the corpus is "jumps".

For the second HPDL term, "rabbit", there are no contextual characteristics, because "rabbit" does not appear in the corpus. As such, the only contextual characteristic of the HPDL is the word "jumps". It should be noted that although the present embodiment includes a simple example with one contextual characteristic, in many embodiments the HPDL has a plurality of context characteristics.

Once contextual characteristics for the HPDL have been identified, those characteristics are then applied to the candidate terms. In the present example, the only candidate term to immediately precede the word "jumps" is "kangaroo". As such, "kangaroo" (the "first term") is the only term included in the current generation of discovered terms. In other embodiments of the present invention, however, the current generation may include a plurality of discovered terms. In those embodiments, additional steps may be taken to further refine the list of discovered terms (for some examples, see the Further Comments and/or Embodiments Sub-Section of this Detailed Description).

Processing proceeds to step S265, where update terms mod 306 adds the current generation of terms to the HPDL. In the present embodiment, the term "kangaroo" is added to the HPDL, with the resulting HPDL (or "revised set of category related terms") being as follows: (i) fox; (ii) rabbit; and (iii) kangaroo.

Processing proceeds to step S270, where update terms mod 306 deletes the current generation of terms from the candidate terms list. In the present embodiment, the term "kangaroo" is removed from the candidate terms list, with the resulting candidate terms list being as follows: (i) dog; (ii) frog; and (iii) sloth.

Processing proceeds to step S275, where iterate mod 308 checks to see if method 250 is on its last iteration. In the present embodiment, a total of two iterations are to be performed. As such, method 250 is not on its last iteration (NO), and processing returns to step S260 for another iteration. In other embodiments, however, other tests may be used. For example, in one embodiment, iterations may occur until the HPDL reaches a certain size. In another embodiment, iterations may continue to occur for a certain period of time. In still other embodiments, iterations may continue to occur indefinitely and/or until no further terms for the HPDL are discovered.

In the present example, upon returning to step S260, discover new generation mod 304 repeats the process of identifying contextual characteristics of the terms in the HPDL. However, this time, there is an additional term ("kangaroo") in the HPDL. As a result, an additional contextual characteristic (or "first term contextual characteristic") is identified: the word "leaps", which immediately follows the word "kangaroo" in the second sentence of the corpus. As such, when the updated contextual characteristics are applied to the candidate terms, an additional match is found: the term "frog" appears immediately before the word "leaps" in the corpus. As a result, "frog" (the "second term") is added to the current generation of discovered terms.

Processing proceeds to step S265, where update terms mod 306 adds "frog" to the HPDL, resulting in the following HPDL: (i) fox; (ii) rabbit; (iii) kangaroo; and (iv) frog. Processing then proceeds to step S270, where update terms mod 306 removes "frog" from the candidate terms list, with the resulting candidate terms list being as follows: (i) dog; and (ii) sloth.

Processing proceeds to step S275. In the present example, two iterations have now completed, which means that method 250 is on its final iteration. Therefore, step S275 resolves to "YES", and processing proceeds to step S280, where method 250 ends. As a result of executing the method 250, the HPDL for the domain of "things that jump" now includes two additional terms ("kangaroo" and "frog"), and will be able to further extract contextually relevant terms in future iterations and/or from different corpuses. Additionally, system 102 now also has a list of candidate terms ("dog" and "sloth") that may be helpful for other NLP-related tasks.

III. Further Comments and/or Embodiments

Some embodiments of the present invention recognize the following facts, potential problems and/or potential areas for improvement with respect to the current state of the art: (i) some existing approaches (including approaches that rely on linguistic processors to extract candidate terms) do not perform well when the corpus (or text) has a different genre (or domain) than the corpus used to build the processor; (ii) some existing approaches rely purely on statistical methods (such as n-gram sequences or topic modeling) to extract candidate terms, thereby negatively affecting system precision; (iii) existing approaches can be configured to provide terms with either high precision or high recall, but not both (thereby negatively affecting the overall accuracy of the system); and/or (iv) existing approaches are unable to discover new domain-specific terms directly from the corpus in a bootstrapping manner.

Some embodiments of the present invention may include one, or more, of the following features, characteristics and/or advantages: (i) using contextual similarity with a high precision domain lexicon for ranking; (ii) extracting candidate terms statistically; (iii) using an approach other than singular value decomposition; (iv) extracting terms without using linguistic processors; (v) extracting terms without analyzing linguistic or structural characteristics of a document; (vi) extracting terms without using syntactic and semantic contextual analysis; (vii) extracting terms without using dictionary-based statistics; (viii) extracting terms without using specialized corpora; (ix) extracting terms based on contextual information of a lexicon obtained from a given corpus; and/or (x) using association rules to measure unithood and/or filter candidate terms.

Many embodiments of the present invention are adapted to identify terms (nouns or noun phrases) from a corpus with both high precision and recall without using any linguistic processors and open domain linguistic resources (such as dictionaries and ontology). In doing so, these embodiments may include one, or more, of the following features, characteristics and/or advantages: (i) providing an iterative approach to term discovery where discovery depends on weighted contextual characteristics of already discovered terms in previous iterations; (ii) ranking pure statistically extracted candidate terms (N-grams) based on their noun specificity and term specificity determined using weighted contextual similarity with known terms (nouns or noun phrases); (iii) using association rules, filtering candidate terms that cannot exist independently; and/or (iv) validating unithood of candidate terms using association rules.

Some embodiments of the present invention may further include one, or more, of the following helpful features, characteristics, and/or advantages: (i) achieving positive results in entity set expansion tasks, where the goal is to identify entities from the corpus in a bootstrapping manner; (ii) performing well on diverse domains such as medical and/or news; (iii) performing better term extraction for any language, including languages for which linguistic processors are not built or do not perform well for; and/or (iv) keeping resources such as dictionaries, lexicons, ontologies, and/or entity lists up-to-date.

Figure 4:
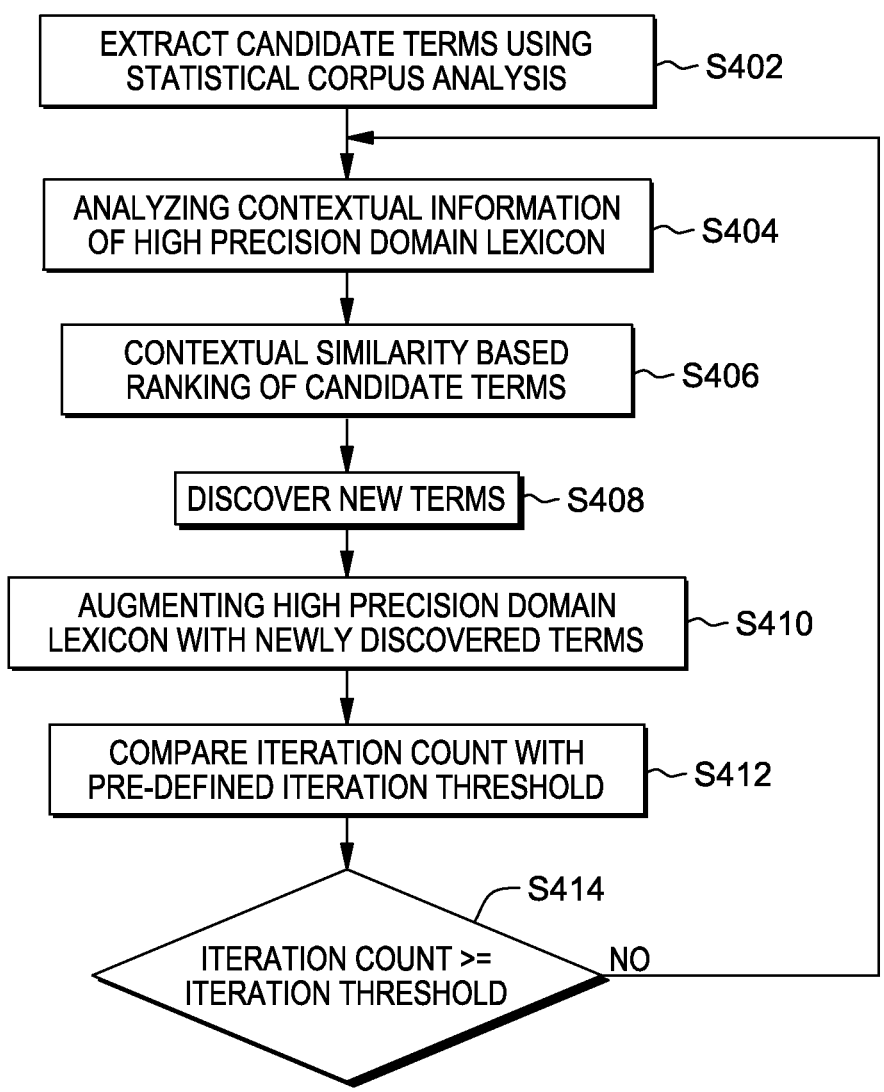
FIG. 4 is a flowchart view of a method according to the present invention.

Method 400 according to the present invention is provided in FIG. 4. Method 400 is adapted to extract terms and their variants from a corpus with both high precision and high recall. High precision and recall occur even if the corpus has a domain that is different than the system's source domain, or if the corpus is in a language for which linguistic systems are not available or mature. Processing begins with step S402, where the method 400 uses a statistical corpus analysis to extract candidate terms. This step S402 uses known (or to be known in the future) statistical approaches (such as frequent item set mining, language mining, and topic modeling) to extract potential candidate terms from the corpus. Additionally, step S402 filters out irrelevant potential candidate terms using statistical criteria.

Processing proceeds to step S404, where the method 400 creates a high precision domain lexicon and analyzes contextual information therein. The high precision domain lexicon terms (or "lexicon terms") are either manually extracted from the corpus or automatically extracted using any system (known or to be known in the future) configured to focus on high precision. Once the lexicon terms have been extracted, context words of those lexicon terms (such as the words appearing before and after the lexicon terms in the corpus) are extracted and weighed to create a set of weighted term context words.

Processing proceeds to step S406, where the method 400 ranks the candidate terms (see step S402) based on contextual similarity with the weighted term context words.

Processing proceeds to step S408, where method 400 selects the top candidate terms as discovered terms. The number of top candidate terms to be selected is a preconfigured value that depends on application and business context.

Processing proceeds to step S410, where the newly discovered terms (that is, the top candidate terms) are added to the high precision domain lexicon. Once the newly discovered terms have been added, they are deleted from the candidate terms list.

Processing proceeds to step S412, where the method 400 compares an iteration count with a pre-defined iteration threshold (where the iteration threshold is determined based on application and business context). Processing then proceeds to step S414. If the iteration count is less than the iteration threshold (NO), processing returns to step S404 to discover more relevant terms from the corpus. If the iteration count is greater than or equal to the iteration threshold, however, processing for method 400 completes. As a result of method 400 completing: (i) the high precision domain lexicon now includes additional relevant domain terms; and (ii) the list of candidate terms includes additional contextually relevant terms that may be used for natural language processing or other tasks.

Figure 5:
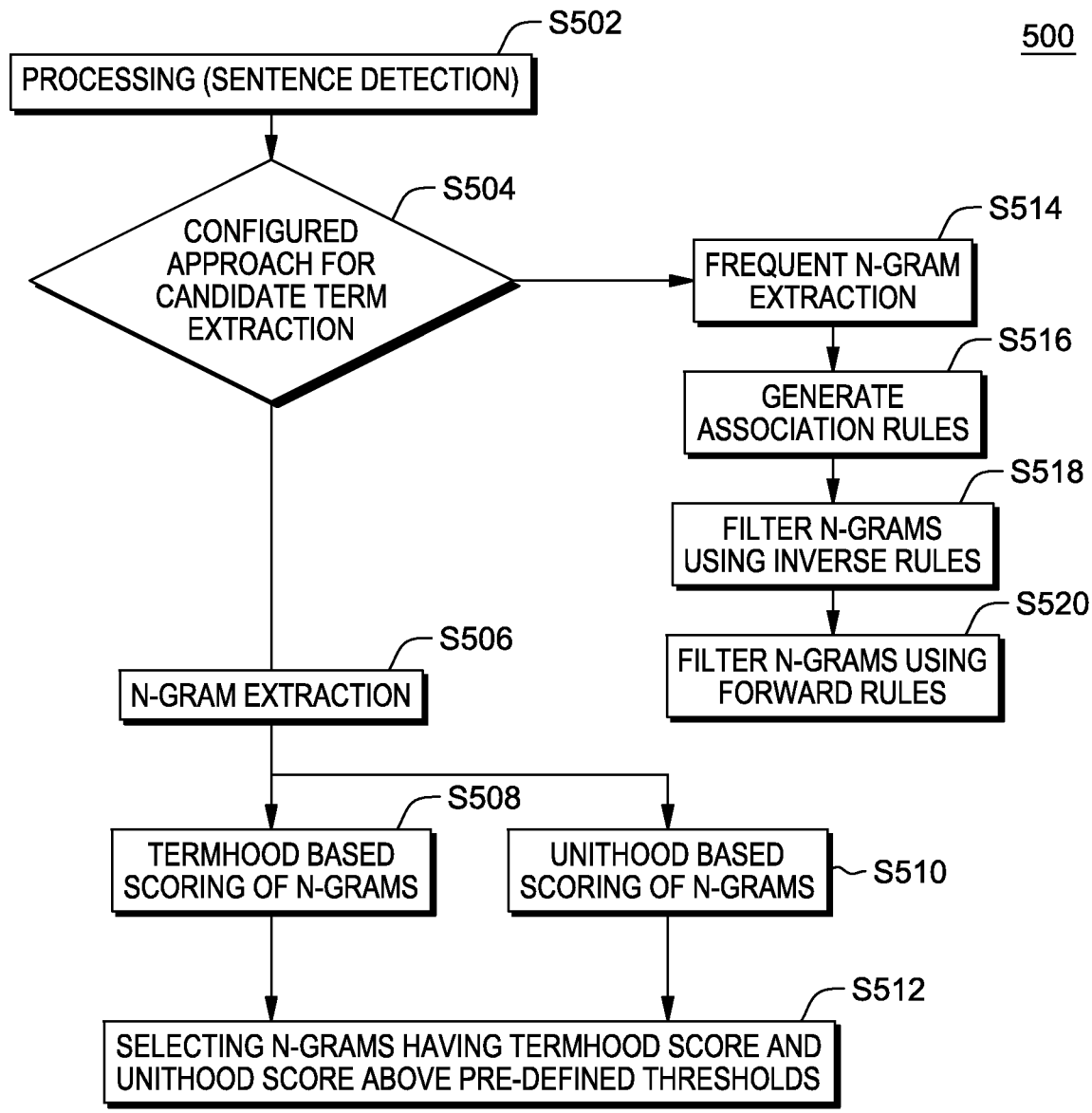
FIG. 5 is a flowchart view of a method according to the present invention.

In some embodiments of the present invention, step S402 (Extract Candidate Terms using Statistical Corpus Analysis, see FIG. 4) further includes method 500 (see FIG. 5). Method 500 is adapted to apply statistic approaches to the corpus to extract potential candidate terms. The potential candidate terms are passed through statistical filters to identify relevant terms, resulting in new candidate terms. Processing begins with step S502, where method 500 extracts text from the corpus and then applies heuristics-based sentence splitters on the text to extract sentences.

Processing proceeds to step S504, where various statistical methods are applied to the extracted sentences for candidate term extraction. The method to be used is typically determined based on a few factors: (i) the type of document the corpus is (for example, a web page, a text book, or a manual); (ii) the length of the corpus (for example, the number of words in the corpus); and/or (iii) the general domain of the corpus (for example, healthcare, finance, or telecommunication). Although many methods may be used, two are discussed below: (i) a statistical language modeling method (beginning with step S506); and (ii) an associated rule mining method (beginning with step S514).

If the statistical language modeling method is chosen, processing proceeds to step S506, where the method 500 extracts n-grams from each extracted sentence in the corpus for each preconfigured value of n. N may be determined in a number of ways, including, for example, by conducting experiments or by prioritizing certain features (such as speed vs. accuracy). An n-gram is a contiguous sequence of words from a given extracted sentence, where 'n' represents the number of words in the sequence. All unique n-grams of the corpus are considered as potential candidate terms.

Processing proceeds to steps S508 and S510, where method 500 scores the potential candidate terms based on their termhood and unithood, respectively. Termhood (as used in step S508) scores the validity of the potential candidate term as a representative for the corpus content as a whole using one or more statistical measures now known (or to be known in the future). In one embodiment, a measure of frequency in a corpus is used. In another embodiment, a measure of 'weirdness' (the term's frequency in the corpus compared to its frequency in a reference corpus) is used. In yet another embodiment, a measure of the pertinence or specificity of the term to a particular domain is used.

Unithood (as used in step S510) scores the collocation strength (the strength of parts of terms) of potential candidate terms using one of the statistical measures now known (or to be known in the future). In one embodiment, a mutual information test is used. In another embodiment, a t-test is used.

Once steps S508 and S510 have completed, processing proceeds to step S512. In step S512, potential candidate terms with termhood and unithood scores above pre-defined thresholds are selected and identified as candidate terms, and processing for method 500 completes.

If the associated rule mining method is chosen in step S504 (as opposed to the statistical language modeling method discussed above), processing proceeds to step S514. In this step, method 500 uses an algorithm to extract frequent n-grams. The extracted frequent n-grams are identified as potential candidate terms.

An example of a way to extract frequent n-grams (sets of words occurring in a specific order) is to extract n-grams meeting the following criteria: (i) the n-grams are frequent; and (ii) the order preserving a subset of the n-grams is frequent. In other words, in this embodiment method 500 first extracts unigrams (i.e. single words) that are frequent (that is, they have a frequency above a pre-defined threshold). Then, method 500 extracts frequent bigrams (i.e. two-word phrases) that are made up of the previously identified unigrams. This continues for n steps (where n equals the number of words in the phrase being analyzed). Another way to express this example extraction method is to say that for n>1, the system extracts n-grams that are frequent and also include frequent (n−1)-grams. For n=1, the system extracts unigrams that are frequent.

Processing proceeds to step S516, where the method 500 analyzes each potential candidate term and generates association rules along with corresponding confidence values. To generate association rules, step S516 performs three tasks: (i) for every potential candidate term t, all non-empty ordered subsets s are generated; (ii) for every subset s of t, a forward rule, "s→t-s", along with its confidence (measured as frequency of t divided by the frequency of s) is generated; and (iii) for every subset s of t, an inverse rule, "s←t-s", along with its confidence, is generated. To provide an example, in one embodiment of the invention, term t is "Mobile Phone A". Applying task (i), the subsets for "Mobile Phone A" are: (a) "Mobile"; (b) "Phone"; (c) "A"; (d) "Mobile Phone"; and (e) "Phone A". Applying task (ii), a forward rule for "Mobile Phone A" is "Mobile Phone→A". And applying task (iii), an inverse rule is "Mobile←Phone A".

Processing proceeds to step S518, where n-grams are filtered using the inverse rules created in step S516. In this step, term variations are identified and removed based on their confidence score. The method 500 identifies a term variation if an inverse rule from term variation to term has a confidence score above a predefined threshold (determined experimentally, for example). For example, "Mobile Phone A" has one inverse rule with a confidence score above the predefined threshold: "Mobile←Phone A". Because the confidence score is over the threshold, the method 500 identifies that "Phone A" is a variation of "Mobile Phone A" and removes "Phone A" from the list of potential candidate terms.

Processing proceeds to step S520, where n-grams are filtered using forward rules (which serve as a measure of unithood for potential candidate terms). The confidence of forward rules provides the probability of the order of term constituents. If none of the forward rules for a term have a confidence score above a pre-defined threshold, that term is removed from the potential candidate term. For example, the term "Manufacturer launches new" has two forward rules: "Manufacturer launches→new" and "Manufacturer→ launches new". Because neither of the forward rules have a confidence level above the threshold, they are removed from the list of potential candidate terms.

Upon completing step S520, processing for method 500 completes, resulting in a new list of candidate terms from the remaining potential candidate terms.

Figure 6:
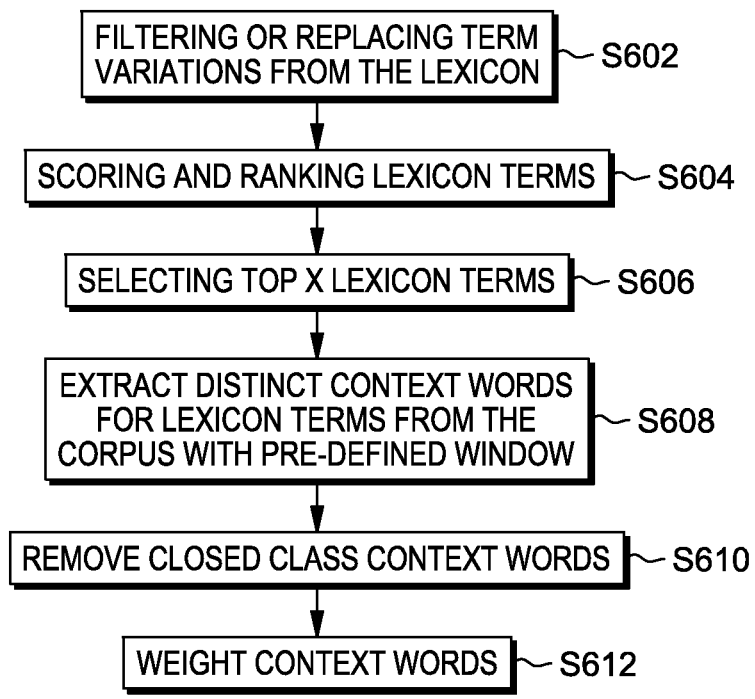
FIG. 6 is a flowchart view of a method according to the present invention.

In some embodiments of the present invention, step S404 (Analyzing Contextual Information of High Precision Domain Lexicon, see FIG. 4) further includes method 600 shown in FIG. 6. Processing begins with step S602, where a high precision domain lexicon is created (either manually or automatically using methods configured to focus on high precision) or provided from previous iterations of method 600. Term variations from the lexicon are then filtered and/or replaced using previously generated inverse rules, if available (for example, from step S518 (see FIG. 5)). A term from the lexicon is identified as a term variation if an inverse rule from the term to some other longer term has a confidence score above pre-defined threshold. If the longer term is a part of the lexicon, then the term identified as a term variation is removed. For example, if "Mobile Phone A" and "Phone A" are in the lexicon and inverse rule "Mobile←Phone A" has a confidence level above the threshold, then "Phone A" is removed from the lexicon. If the longer term is not part of lexicon, then the lexicon term is replaced with longer term. For example, if "Phone" is in the lexicon and the inverse rule "Mobile←Phone" has a confidence level above the threshold, then "Phone" is replaced with "Mobile Phone".

Processing proceeds to step S604, where method 600 scores lexicon terms and ranks them based on their scores. Scoring may be performed by a variety of methods now known (or to be known in the future), and may be based on properties such as term frequency observed in a given corpus. Processing proceeds to step S606, where the top X terms are selected, where X is pre-defined (and determined experimentally, for example).

Processing proceeds to step S608, where context words are extracted from the corpus. First, occurrences of lexicon terms within a given corpus are identified. Then, for each occurrence, context words are extracted per a pre-defined window size (for example, the two words before and the two words after a lexicon term). The words within the window are identified as context words and added to a list of context words. Processing proceeds to step S610, where closed class context words (such as determiners, prepositions, pronouns, and/or conjunctions) are removed from the list of context words.

Processing proceeds to step S612, where each context word is weighted. In some embodiments, the weight of a context word equals the number of unique terms the context word appears in divided by the total number of terms. Processing for method 600 concludes with a list of weighted term context words.

Figure 7:
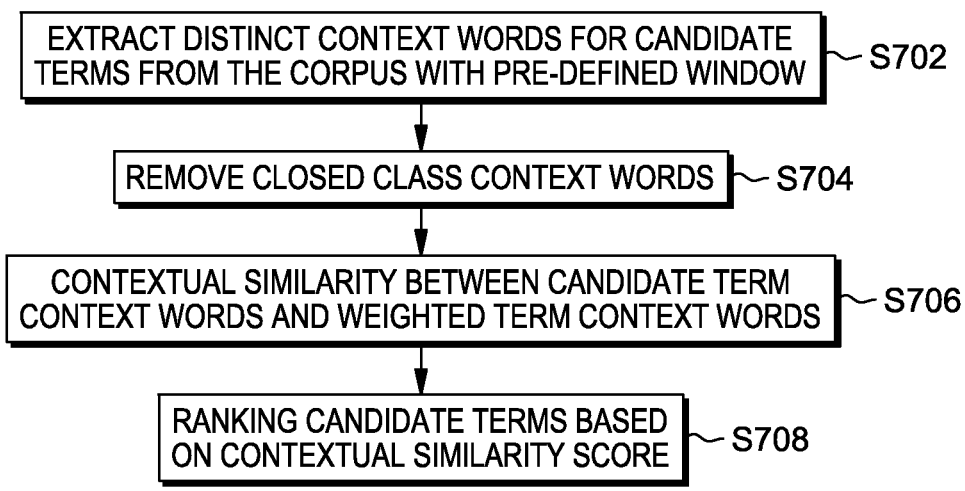
FIG. 7 is a flowchart view of a method according to the present invention.

In some embodiments of the present invention, step S406 (Contextual Similarity based ranking of Candidate Terms, see FIG. 4) further includes method 700 shown in FIG. 7. Processing begins with step S702, where context words for candidate terms are extracted. First, occurrences of each candidate term (see discussion of method 500, above) in the corpus are identified. Then, from each occurrence, context words are extracted per a pre-defined window size (for example, the two words before and the two words after each candidate term).

Processing proceeds to step S704, where closed class context words (such as determiners, prepositions, pronouns, and/or conjunction) are removed from the list of context words. The remaining context words ("candidate term context words") are selected, stored (along with their frequency), and mapped to their corresponding candidate terms.

Processing proceeds to step S706, where the contextual similarity between candidate term context words (see step S704, above) and weighted term context words (see discussion of method 600, above) is measured by a contextual similarity score. The contextual similarity score may be obtained by a number of methods now known or to be known in the future. In one example embodiment, the contextual similarity score is represented by the equation "$\Sigma i\, Wi*Fi$", where: 'i' equals the number of distinct context words for a candidate term; 'Wi' equals the weight of the context word in the weighted term context words ('Wi' equals zero when the context word is not in a set); and 'Fi' equals the frequency of the context word with respect to the candidate term in a given corpus.

Processing proceeds to step S708, where candidate terms are ranked based on the contextual similarity score obtained in step S706 (and discussed in the preceding paragraph). The result of this step is a list of ranked candidate terms.

Figure 8:
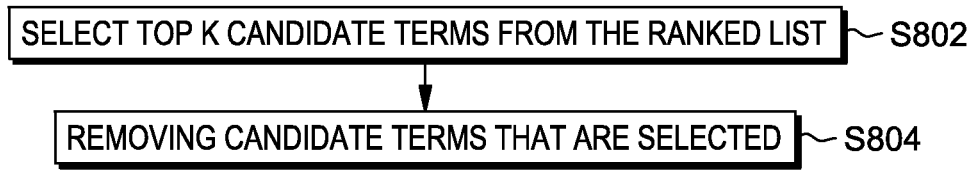
FIG. 8 is a flowchart view of a method according to the present invention.

In some embodiments of the present invention, step S408 (Discover New Terms, see FIG. 4) further includes method 800 shown in FIG. 8. Processing begins with step S802, where method 800 selects the top K candidate terms from the ranked list and creates a set of top K candidate terms, where the value of K is pre-configured. Processing then proceeds to step S804, where method 800 removes any candidate terms from the set if they are also part of domain lexicon. The remaining terms from the list of top k candidate terms are identified as, simply, "terms" and processing for method 800 completes.

For explanation purposes, an example embodiment demonstrating the present invention and portions of the above-discussed methods 400, 500, 600, 700, 800 (see FIGS. 4, 5, 6, 7, and 8) is provided. Referring first to method 500 (see FIG. 5), table 900 (see FIG. 9) shows the results of step S514 on an example corpus. In this example, 'n' equals '4'. Table 900 begins with row 902, which shows the result of a frequent unigram extraction on the example corpus (showing both the extracted unigrams and their corresponding frequencies).

Referring still to table 900, row 904 shows the result of a frequent bigram extraction on the example corpus (showing both the extracted bigrams and their corresponding frequencies). The frequency threshold for the bigram extraction is 30; as such, bigrams with a frequency of less than 30 (none, in this example) will not be included in the output for step S514.

Referring still to table 900 (see FIG. 9), row 906 shows the result of a frequent trigram extraction on the example corpus (showing both the extracted trigrams and their corresponding frequencies). The frequency threshold for the trigram extraction is 20; as such, trigrams with a frequency of less than 20 (none, in this example) will not be included in the output for step S514.

Still referring to table 900 (see FIG. 9), row 908 shows the result of a frequent 4-gram extraction on the example corpus (showing both the extracted 4-grams and their corresponding frequencies). The frequency threshold for the 4-gram extraction is 10; as such, trigrams with a frequency of less than 10 (none, in this example) will not be included in the output for step S514. The resulting example output of row 908, combined with the output from rows 902, 904, and 906, make up the entire list of frequent n-grams generated by step S514.

Table 1000 (see FIG. 10) shows the results of step S516 (see FIG. 5), where association rules are generated from the list of frequent n-grams generated by the previous step S514. Specifically, row 1002 (see FIG. 10) shows the generated forward rules, along with their corresponding confidence values (see discussion of step S516, above). Although a given term can have multiple forward rules, in the present example, for each term, only the forward rule with the maximum confidence value is shown. Row 1004 (see FIG. 10) similarly shows the generated inverse rules, along with their corresponding confidence values (again, see discussion of step S516, above). Although a given term can have multiple inverse rules, in the present example, for each term, only the inverse rule with the maximum confidence value is shown.

Table 1100 (see FIG. 11) shows the results of steps S518 and S520 (see FIG. 5), where the n-grams created in step S514 are filtered using the inverse rules and the forward rules generated in step S516. In step S518, the inverse rules are applied to the list of frequent n-grams. For each inverse rule over a pre-defined confidence value threshold (in the present example, 0.8), the term on the right-hand side of the rule is removed from the list of frequent n-grams. The general reasoning for this is that when an inverse rule has a high threshold value, it is unlikely that the term on the right-hand side would exist independently separate from the term on the left hand side. To provide an example, because the inverse rule "ManufacturerA←PhoneD" has a confidence value of 1.00, "Phone D," which is on the right hand side of the rule, is removed from the list of frequent n-grams (as "Phone D" is unlikely to appear without "ManufacturerA" as a prefix). Row 1102 of table 1100 shows all of the n-grams that have been filtered using the inverse rules, and row 1104 shows the n-grams that remain after that filtering.

In step S520, the forward rules are applied to the list of frequent n-grams. For each remaining n-gram in the list of frequent n-grams, the n-gram is removed from the list if it doesn't have a corresponding forward rule above a pre-defined confidence value threshold (in the present example, 0.8). To provide an example, because forward rule "ManufacturerB PhoneA W→4G" has a confidence value of 1.00 (which is greater than 0.8), the term "ManufacturerB PhoneA W 4G" remains on the list. Conversely, because the forward rule "Connect→ManufacturerA" has a confidence value of 0.10, the term "Connect ManufacturerA" is removed from the list. Row 1106 of table 1100 shows all of the n-grams that have been filtered using the forward rules, and row 1108 shows the n-grams that remain after that filtering and are considered candidate terms.

Referring now to method 600 (see FIG. 6), table 1200 (see FIG. 12) shows the results of steps S602, S604, and S606. Row 1202 shows the lexicon terms that have been extracted at the beginning of step S602. These terms are considered to be high precision domain lexicon terms for the domain of smartphones (collectively, they are referred to as the "high precision domain lexicon," the "lexicon," and/or the "lexicon terms").

Continuing with step S602, method 600 identifies the n-grams from the corpus that end with any of the terms from the domain lexicon. Method 600 generates inverse rules for these n-grams along with corresponding confidence values. If the confidence of an inverse rule exceeds a pre-determined confidence value threshold (in this case, 0.8), then the method checks if the full term of the inverse rule is included in the high precision domain lexicon. If so, the term on the right-hand side of the rule is removed from the lexicon. If not, then the right-hand side term is replaced in the lexicon by the full term of the inverse rule. To provide an example of this, row 1204 of table 1200 shows both of the generated inverse rules that meet the confidence value threshold in the present example embodiment, along with their corresponding confidence values. For the first rule, "ManufacturerC←PhoneB 12," because "ManufacturerC PhoneB 12" is already included in the lexicon, "Phone B," (that is, the term on the right-hand side of the rule) is removed from the lexicon. Conversely, for the second rule, "ManufacturerB←PhoneC," because "ManufacturerB PhoneC" is not in the lexicon, "PhoneC" is replaced by "ManufacturerB PhoneC" in the lexicon. The resulting, modified lexicon terms are shown in row 1206 of table 1200.

Still referring to table 1200 (see FIG. 12), row 1208 shows the results of step S604 (see FIG. 6), where the lexicon is scored using a C-Value/NC-Value method. As shown in table 1200, the lexicon terms are ranked based on their respective scores. In the next method step S606, the top X terms are selected. In the present case, X equals 5, so all four of the lexicon terms are selected, as shown in row 1210 of FIG. 12.

Referring still to the present example embodiment, table 1300 (see FIG. 13) shows the results of steps S608, S610, and S612 (see FIG. 6). In step S608 (shown in row 1302), context words for lexicon terms are extracted from the corpus with a pre-defined window. In the present embodiment, the window extends to one word before the term and one word after the term. So, when a lexicon term is found in the corpus, the word immediately preceding that lexicon term and the word immediately following the lexicon term are added to a list of context words. The list of context words is shown in row 1302, where each context word is listed along with the lexicon term(s) used to identify the context word.

Proceeding to step S610, a list of various closed-class words (such as determiners, prepositions, pronouns, and conjunctions) is used to reduce the number of words included in the list of context words. Row 1304 of table 1300 (see FIG. 13) shows the results of step S610 in the present example embodiment, where words such as "to," "from," and "your" have been removed from the list.

Referring still to table 1300 (see FIG. 13), step S612 provides weights for the context words, thereby creating weighted term context words. As mentioned above in the discussion of step S612, the weight of a given word is equal to the number of lexicon terms the word appeared with in the corpus divided by the total number of lexicon terms. The resulting weighted context words for the present example embodiment are shown in row 1306 of table 13.

Referring now to method 700 (see FIG. 7), table 1400 (see FIG. 14) shows the results of steps S702 and S704 for the present example embodiment. In step S702 (the results of which are shown in row 1402), context words for candidate terms (see discussion of method 500, above) are extracted from the corpus with a predefined window. In the present embodiment, the window extends to one word before the term and one word after the term (as in step S608). So, when a candidate term is found in the corpus, the word immediately preceding the candidate term and the word immediately following the candidate term are extracted and added to a list of context words. Row 1402 shows the extracted context words for the present embodiment, along with their corresponding candidate terms. The number of times a context word appears with each candidate term denoted by parentheses.

Processing continues to step S704, where closed-class context words (such as determiners, prepositions, pronouns, and conjunctions) are removed from the list of context words in a manner similar to the removal of closed-class context words in step S610. The resulting list of context words is shown in row 1404 of table 1400 (see FIG. 14).

Table 1500 (see FIG. 15) shows the results of steps S706 and S708 for the present example embodiment. In step S706, for each candidate term, a contextual similarity analysis is performed between the candidate term's context words (produced in step S704, discussed above) and the weighted term context words (produced in step S612, discussed above). In the present embodiment, the resulting contextual similarity score is calculated by computing the sum, for each of a candidate term's context words, of the candidate term's frequency with that context word multiplied by the context word's weight. If the given context word is not listed in the list of weighted term context words, then the weight of the context word is zero. The calculations for computing the contextual similarity score for each candidate term in the present example embodiment are shown in row 1502 of table 1500 (see FIG. 5). In the next row 1504, the candidate terms are listed according to their resulting contextual similarity scores (as a result of the contextual similarity score ranking that occurs in step S708).

Referring now to method 800, table 16 (see FIG. 16) shows the results of steps S802 and S804 (see FIG. 8) for the present example embodiment. In step S802 of this embodiment, the top K candidate terms are selected from the ranked list produced in step S708 (and shown in row 1504 of table 1500 (see FIG. 15)). In this example, K equals six. The resulting discovered terms (that is, the top six terms from the ranked list of candidate terms) are shown in row 1602 of table 1600 (see FIG. 16). In the following step S804, the discovered terms produced in step S802 are removed from the list of candidate terms. The terms remaining in the list of candidate terms after this step are shown in row 1604 of table 1600.

After completion of the steps in method 800, processing returns back to step S410 in method 400 (see FIG. 4), where the newly discovered terms from step S802 are added to the high precision domain lexicon. The new, modified, high precision domain lexicon for the present example embodiment is shown in row 1606 of table 1600.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Contextual characteristic: a feature of a term derived from that term's particular usage in a corpus; some examples of possible contextual characteristics include: (i) proximity related characteristics such as the words located within n words of the term, the words located farther than n words away from a term, and/or the distance between the term and a specific, pre-identified word; (ii) frequency-related characteristics such as the number of times the term appears in the corpus, the most/least number of times the term appears in a sentence, and/or the relative percentage of the term compared to the other terms in the corpus; and/or (iii) usage-related characteristics such as the location of the term in a sentence, the location of the term in a paragraph, whether the term commonly appears in the singular form or in plural form, whether the term regularly appears as a noun/verb/adjective/adverb/subject/object, the adjectives used to describe the term (when a noun), the adverbs used to describe a term (when a verb), the nouns the term typically describes (when an adjective), the verbs the term typically describes (when an adverb), the object of the term (when a subject), and/or the subject of the term (when an object).

What is claimed is:

1. A computer-implemented method comprising:
receiving a predefined lexicon of domain term(s) relating to a domain, where the domain term(s) include nouns and/or noun phrases;
identifying a set of initial context word(s) from a corpus, where each initial context word of the set of initial context word(s) appears, in the corpus, within a certain number of words of at least one domain term of the lexicon of domain term(s);
identifying a first term from a corpus, where the first term is different from the domain term(s) of the lexicon of domain term(s), and where the first term is identified, based, at least in part, on the contextual use of the first term in the corpus matching the contextual use of at least one domain term of the lexicon of domain term(s) in the corpus, according to at least one context word of the first term in the corpus matching at least one initial context word of the set of initial context word(s);
adding the first term to the lexicon of domain term(s), thereby creating a revised lexicon of domain term(s) and a set of first term context word(s), where each first term context word of the set of first term context word(s) appears, in the corpus, within a certain number of words of the first term; and
identifying a second term from the corpus, where the second term is different from the domain term(s) of the revised lexicon of domain term(s), and where the second term is identified based, at least in part, on the contextual use of the second term in the corpus matching the contextual use of the first term in the corpus, according to at least one context word of the second term in the corpus matching at least one first term context word of the set of first term context word(s).

2. The method of claim 1, further comprising:
adding the second term to the revised lexicon of domain term(s), thereby creating a second revised lexicon of domain term(s) and a set of second term context word(s), where each second term context word of the set of second term context word(s) appears, in the corpus, within a certain number of words of the second term; and
identifying a third term from the corpus, where the third term is different from the domain term(s) of the second revised lexicon of domain term(s), and where the third term is identified based, at least in part, on the contextual use of the third term in the corpus matching the contextual use of the second term in the corpus, according to at least one context word of the third term in the corpus matching at least one second term context word of the set of second term context word(s).

3. The method of claim 1, wherein:
the identifying of the second term from the corpus is further based, at least in part, on the set of initial context word(s).

4. The method of claim 1, wherein:
the first term belongs to a set of relevant term(s), where each relevant term of the set of relevant term(s) is extracted from the corpus using a statistical extraction method, and where the statistical extraction method includes:
  extracting potential candidate terms from the corpus,
  scoring the potential candidate terms for termhood and unithood using statistical measure(s), where termhood relates to validity of potential candidate terms as representatives for the corpus as a whole, and where unithood relates to collocation strength of potential candidate terms, and
  identifying potential candidate term(s) that exceed predefined thresholds for termhood and unithood as candidate relevant term(s) of the set of relevant term(s).

5. The method of claim 1, wherein:
each initial context word of the set of initial context word(s) includes a contextual weight corresponding to the respective initial context word's use in the corpus.

6. The method of claim 5, wherein:
the identifying of the first term in the corpus is further based, at least in part, on a weighted strength of a match between the first term and the respective contextual weights of each initial context word in the set of initial context word(s).

7. The method of claim 1, wherein:
the first term belongs to a set of relevant term(s), where each relevant term of the set of relevant term(s) is extracted from the corpus using an associated rule mining method, and where the associated rule mining method includes:
  extracting potential candidate terms from the corpus,
  generating association rules for each potential candidate term,
  filtering the potential candidate terms based, at least in part, on the respective association rules of the potential candidate terms, and
  identifying the filtered potential candidate terms as relevant term(s) of the set of relevant terms.

8. The method of claim 7, wherein:
generating association rules for each potential candidate term includes generating forward rules, inverse rules, and respective confidence scores for the forward rules and inverse rules, where the forward rules identify words that immediately follow potential candidate terms in the corpus, and where the inverse rules identify words that immediately precede potential candidate terms in the corpus; and
filtering the potential candidate terms based, at least in part, on the respective association rules of the potential candidate terms includes: (i) removing potential candidate terms determined to be variations of other potential candidate terms, based, at least in part, on one or more of the generated inverse rules having confidence scores that exceed a first threshold, and (ii) removing potential candidate terms that do not have any forward rules with confidence scores that exceed a second threshold.

9. The method of claim 1, wherein the identifying of the set of initial context word(s) includes:
  filtering the domain term(s) of the predefined lexicon of domain term(s) to remove term variations;
  generating scores for the filtered domain term(s) based, at least in part, on frequency in the corpus;
  selecting a subset of the filtered domain term(s) based, at least in part, on the generated scores;
  extracting domain term context word(s) from the corpus for each of the filtered domain term(s) of the subset;
  filtering the extracted domain term context word(s) to remove closed class context word(s); and
  identifying the filtered domain term context word(s) as the set of initial context word(s).

10. The method of claim 9, wherein the identifying of the first term from the corpus includes:
  extracting candidate term context words from the corpus for each of a plurality of candidate terms in the corpus;
  filtering the extracted candidate term context words to remove closed class context word(s);
  measuring a contextual similarity between the filtered candidate term context word(s) and the initial context word(s); and
  determining that the contextual use of the first term in the corpus matches the contextual use of at least one domain term of the lexicon of domain term(s) in the corpus, based, at least in part, on the measured contextual similarity between candidate term context word(s) for the first term and the initial context word(s).

11. The method of claim 10, wherein the closed class context words are selected from the group consisting of determiners, prepositions, pronouns, and conjunctions.

12. A computer program product comprising a computer readable storage medium having stored thereon:
  program instructions to receive a predefined lexicon of domain term(s) relating to a domain, where the domain term(s) include nouns and/or noun phrases;
  program instructions to identify a set of initial context word(s) from a corpus, where each initial context word of the set of initial context word(s) appears, in the corpus, within a certain number of words of at least one domain term of the lexicon of domain term(s);
  program instructions to identify a first term from a corpus, where the first term is different from the domain term(s) of the lexicon of domain term(s), and where the first term is identified, based, at least in part, on the contextual use of the first term in the corpus matching the contextual use of at least one domain term of the lexicon of domain term(s) in the corpus, according to at least one context word of the first term in the corpus matching at least one initial context word of the set of initial context word(s);
  program instructions to add the first term to the lexicon of domain term(s), thereby creating a revised lexicon of domain term(s) and a set of first term context word(s), where each first term context word of the set of first term context word(s) appears, in the corpus, within a certain number of words of the first term; and
  program instructions to identify a second term from the corpus, where the second term is different from the domain term(s) of the revised lexicon of domain term(s), and where the second term is identified based, at least in part, on the contextual use of the second term in the corpus matching the contextual use of the first term in the corpus, according to at least one context word of the second term in the corpus matching at least one first term context word of the set of first term context word(s).

13. The computer program product of claim 12, wherein:
the first term belongs to a set of relevant term(s), where each relevant term of the set of relevant term(s) is extracted from the corpus using an associated rule mining method, and where the associated rule mining method includes:
  extracting potential candidate terms from the corpus,
  generating association rules for each potential candidate term, filtering the potential candidate terms based, at least in part, on the respective association rules of the potential candidate terms, and identifying the filtered potential candidate terms as relevant term(s) of the set of relevant terms.

14. The computer program product of claim 13, wherein:

generating association rules for each potential candidate term includes generating forward rules, inverse rules, and respective confidence scores for the forward rules and inverse rules, where the forward rules identify words that immediately follow potential candidate terms in the corpus, and where the inverse rules identify words that immediately precede potential candidate terms in the corpus; and filtering the potential candidate terms based, at least in part, on the respective association rules of the potential candidate terms includes: (i) removing potential candidate terms determined to be variations of other potential candidate terms, based, at least in part, on one or more of the generated inverse rules having confidence scores that exceed a first threshold, and (ii) removing potential candidate terms that do not have any forward rules with confidence scores that exceed a second threshold.

15. The computer program product of claim 12, wherein the identifying of the set of initial context word(s) includes:

filtering the domain term(s) of the predefined lexicon of domain term(s) to remove term variations;

generating scores for the filtered domain term(s) based, at least in part, on frequency in the corpus;

selecting a subset of the filtered domain term(s) based, at least in part, on the generated scores;

extracting domain term context word(s) from the corpus for each of the filtered domain term(s) of the subset;

filtering the extracted domain term context word(s) to remove closed class context word(s); and identifying the filtered domain term context word(s) as the set of initial context word(s).

16. The computer program product of claim 15, wherein the identifying of the first term from the corpus includes:

extracting candidate term context words from the corpus for each of a plurality of candidate terms in the corpus;

filtering the extracted candidate term context words to remove closed class context word(s);

measuring a contextual similarity between the filtered candidate term context word(s) and the initial context word(s); and determining that the contextual use of the first term in the corpus matches the contextual use of at least one domain term of the lexicon of domain term(s) in the corpus, based, at least in part, on the measured contextual similarity between candidate term context word(s) for the first term and the initial context word(s).

17. A computer system comprising:

a processor(s) set; and a computer readable storage medium;

wherein:

the processor(s) set is structured, located, connected and/or programmed to run program instructions stored on the computer readable storage medium; and the stored program instructions include:

program instructions to receive a predefined lexicon of domain term(s) relating to a domain, where the domain term(s) include nouns and/or noun phrases;

program instructions to identify a set of initial context word(s) from a corpus, where each initial context word of the set of initial context word(s) appears, in the corpus, within a certain number of words of at least one domain term of the lexicon of domain term(s);

program instructions to identify a first term from a corpus, where the first term is different from the domain term(s) of the lexicon of domain term(s), and where the first term is identified, based, at least in part, on the contextual use of the first term in the corpus matching the contextual use of at least one domain term of the lexicon of domain term(s) in the corpus, according to at least one context word of the first term in the corpus matching at least one initial context word of the set of initial context word(s);

program instructions to add the first term to the lexicon of domain term(s), thereby creating a revised lexicon of domain term(s) and a set of first term context word(s), where each first term context word of the set of first term context word(s) appears, in the corpus, within a certain number of words of the first term; and program instructions to identify a second term from the corpus, where the second term is different from the domain term(s) of the revised lexicon of domain term(s), and where the second term is identified based, at least in part, on the contextual use of the second term in the corpus matching the contextual use of the first term in the corpus, according to at least one context word of the second term in the corpus matching at least one first term context word of the set of first term context word(s).

18. The computer system of claim 17, wherein:

the first term belongs to a set of relevant term(s), where each relevant term of the set of relevant term(s) is extracted from the corpus using an associated rule mining method, and where the associated rule mining method includes:

extracting potential candidate terms from the corpus, generating association rules for each potential candidate term, filtering the potential candidate terms based, at least in part, on the respective association rules of the potential candidate terms, and identifying the filtered potential candidate terms as relevant term(s) of the set of relevant terms.

19. The computer system of claim 18, wherein:

generating association rules for each potential candidate term includes generating forward rules, inverse rules, and respective confidence scores for the forward rules and inverse rules, where the forward rules identify words that immediately follow potential candidate terms in the corpus, and where the inverse rules identify words that immediately precede potential candidate terms in the corpus; and filtering the potential candidate terms based, at least in part, on the respective association rules of the potential candidate terms includes: (i) removing potential candidate terms determined to be variations of other potential candidate terms, based, at least in part, on one or more of the generated inverse rules having confidence scores that exceed a first threshold, and (ii) removing potential candidate terms that do not have any forward rules with confidence scores that exceed a second threshold.

20. The computer system of claim 17, wherein the identifying of the set of initial context word(s) includes:

filtering the domain term(s) of the predefined lexicon of domain term(s) to remove term variations;

generating scores for the filtered domain term(s) based, at least in part, on frequency in the corpus;
selecting a subset of the filtered domain term(s) based, at least in part, on the generated scores;
extracting domain term context word(s) from the corpus for each of the filtered domain term(s) of the subset;
filtering the extracted domain term context word(s) to remove closed class context word(s); and
identifying the filtered domain term context word(s) as the set of initial context word(s).

* * * * *